March 25, 1952
S. W. MOULTON
2,590,784
HETERODYNE FREQUENCY MODULATOR WITH AUTOMATIC DEVIATION CONTROL
Filed Nov. 26, 1948
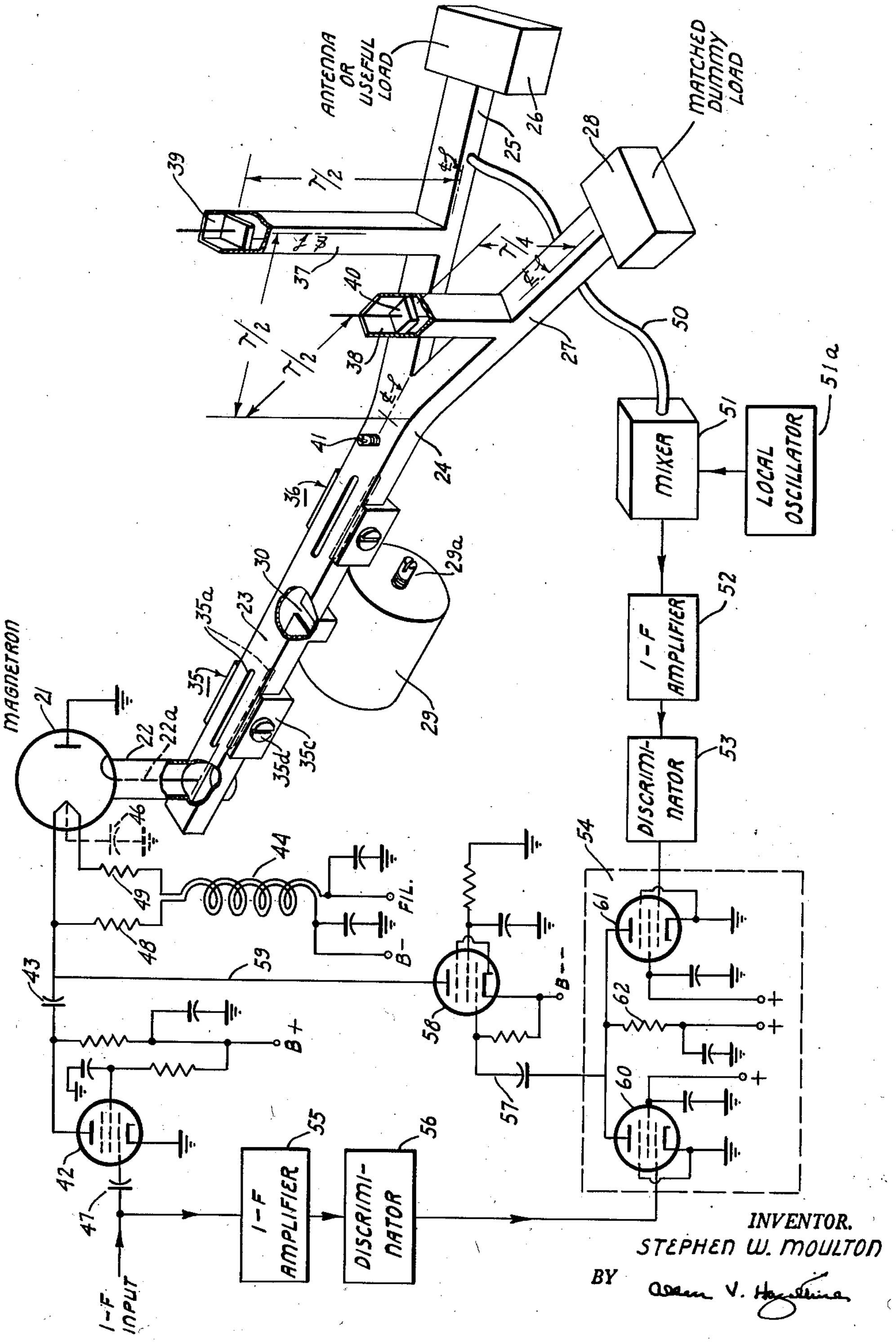
INVENTOR.
STEPHEN W. MOULTON
BY [signature]
AGENT Patented Mar. 25, 1952 2,590,784

UNITED STATES PATENT OFFICE 2,590,784

HETERODYNE FREQUENCY MODULATOR WITH AUTOMATIC DEVIATION CONTROL

Stephen W. Moulton, Philadelphia, Pa., assignor to Philco Corporation, Philadelphia, Pa., a corporation of Pennsylvania Application November 26, 1948, Serial No. 61,979

7 Claims. (Cl. 332—19)

The invention herein described and claimed relates to improvements in modulating systems. More particularly it relates to improvements in heterodyne type modulating systems of the sort described and claimed in copending application of William E. Bradley for Modulation System and Method, Serial No. 787,043, filed Nov. 20, 1947 and assigned to the assignee of the present application.

As set forth in the said copending application, a heterodyne modulating system is one in which two electrical wave signals of predetermined different frequencies are mixed or heterodyned, by employing any known form of mixer, whereby there is produced, in the output from the mixer, which, among others, include components of various frequencies which are, respectively, the sums and differences of the higher of the original frequencies and integral multiples of the lower of said frequencies. If one of the original signals (e. g. the lower in frequency) is frequency-modulated, then in the resultant output spectrum, the component whose frequency is that of the original signal of higher frequency will be of substantially constant frequency, while the components corresponding to the sums and differences of the higher original frequency and integral multiples of the lower (modulated) frequency will vary in frequency in substantial accordance with the variations in the latter frequency. One of these components may therefore be employed as a useful modulated carrier wave output signal whose carrier frequency is higher than the carrier frequency of the original modulated signal. It is to be noted, however, that the energy represented by any one of these modulated heterodyne components will, in general, be small compared to the total energy represented by all of the components in the spectrum. Moreover in general it will be substantially less than that of the component whose frequency is relatively fixed and equal to the higher of the original frequencies. Hence if one of these components is used as the useful output, the efficiency of the system is comparatively low.

The copending Bradley application is directed to the provision of a modulating system incorporating the numerous advantages of heterodyne modulation while overcoming its limitations in respect of low power output. To this end Bradley proposed, by suitable means, to lock or to maintain substantially fixed the frequency of one of the sideband components which, as above pointed out, would normally vary in the same manner as the lower in frequency of the original input signals applied to the mixer. When this was done the carrier component of the spectrum no longer remained fixed in frequency but was caused to vary in some degree in accordance with the modulation of the locked component which would exist if measures were not taken to maintain its frequency substantially fixed. This carrier component, whose frequency was thus caused to vary in accordance with the frequency modulation of the original signal of lower frequency, could then be used as the useful modulated output signal and since, as above mentioned, its energy content was substantially greater than that of the locked component, the efficiency of the system was substantially improved.

In accordance with the Bradley invention, it was proposed that any suitable form of oscillator could be used as the mixer and that it could be amplitude-modulated in response to a frequency-modulated signal whose carrier frequency was lower than the normal frequency of oscillation of the oscillator. The desired output spectrum, as above mentioned, would then appear in the output of the oscillator. Locking of one of the components in this spectrum could be effected either by means of a tuned circuit of suitable Q coupled to the oscillator output circuit and tuned to the mean frequency of the component which it was proposed to lock, or by means of a separate oscillator supplying a signal of substantially constant frequency equal to the mean frequency of the component which it was desired to lock, and whose output was injected into the tank circuit of the heterodyne modulated oscillator so as to effect the desired locking. This system provided an exceedingly effective means for modulating the output of a conventional cavity magnetron and thereby provided a solution to a problem of long standing.

From the foregoing it will be apparent that, in order for a heterodyne modulation system in accordance with Bradley's invention to operate at maximum efficiency, it will be desirable to have the carrier frequency component of the output spectrum as large as possible, while minimizing the magnitudes of the sideband components including the sideband to be locked. This can, of course, be accomplished by suitable adjustments to the modulated oscillator or mixer, as will be discussed hereinafter. However, it also appears that satisfactory locking of a sideband component can not ordinarily be achieved if the power represented by the sideband to be locked is made unduly small compared to the power represented by the carrier component. Thus, if the magnitude of the selected sideband component is reduced below a certain level, it may be impossible to hold it essentially fixed in frequency in order that its variations in frequency may be imparted to the carrier component. The greater the reduction below this level of the power represented by the sideband component, the more will the frequency of the component tend to vary in accordance with variations in frequency of the modulated input signal, and the less will these variations tend to be imparted to the carrier component of the output signal. This result may be regarded as a form of distortion in the modulated carrier wave signal produced. If the variations in frequency of the locked sideband component are linear with respect to the variations in frequency of the modulated input signal, this distortion will not be objectionable, but will amount merely to a gain or loss in deviation of the frequency-modulated output signal compared to that of the frequency-modulated input signal. A loss in deviation may however prove to be of considerable disadvantage in the case of a high frequency relay chain comprising a plurality of relay stages, each employing heterodyne frequency modulation in accordance with the Bradley invention. After transmission through a number of such stages, the intelligence contained in the original frequency modulated signal would, to a large extent, be dissipated unless some special steps were taken to preserve it.

Accordingly it is the primary object of my invention to provide a heterodyne modulating system of the type in accordance with the Bradley invention wherein one of the components in the output of the heterodyne modulator, which normally varies in frequency, is maintained substantially constant in frequency and its frequency variations are imparted to the carrier component in the output of the heterodyne modulator, and wherein, although the magnitudes of the various sideband components in the output of the heterodyne modulator, including the component to be locked, may be relatively very small compared to the magnitude of the carrier component in said output, nevertheless efficient locking of a particular sideband component may be effected so that substantially all of its frequency variations are imparted to the carrier component, whereby a large useful modulated output is obtainable.

I have found that this objective can be achieved through the use of the following general expedients. In accordance with my invention I provide suitable means for comparing the deviation of the modulated carrier component in the output from the heterodyne modulator with the deviation of the frequency modulated input signal thereto. From this comparison it is possible to derive a control signal which is proportional to the difference in deviation between the modulated output carrier and the modulated input signal, which results from incomplete locking of the particular sideband component. This control signal in turn may be used to modify the operation of the heterodyne frequency-modulated oscillator in a manner to compensate for the failure of the system to maintain the frequency of the locked sideband component essentially fixed. For example, the control signal may be applied to vary the normal frequency of oscillation of the heterodyne modulated oscillator. When a magnetron is used, this control may be effected by using the control signal to vary the anode or cathode voltage of the magnetron, or it may be applied to the frequency control element of an electronically deviated magnetron of the sort described in "Proceedings of the Institute of Radio Engineers" for July 1947, page 657. Alternatively, compensation of the modulated output signal may be achieved by varying the tuning of the auxiliary tank circuit which is used to effect locking of the sideband component. For this purpose it would likewise be feasible to utilize the electronic method of varying the tuning of a cavity resonator described in the aforementioned issue of "Proceedings of the Institute of Radio Engineers," page 644 et seq.

The principles of the invention and the manner of practicing it, together with other features and advantages thereof, will be more fully understood from a consideration of the following specification with reference to the single figure which illustrates a typical embodiment of the invention as applied to a heterodyne modulated oscillator of the sort disclosed in the aforementioned copending Bradley application.

Referring now to the figure, the output of a cavity magnetron oscillator 21 is supplied through a length of coaxial transmission line 22, of suitable characteristics, to one end of a waveguide section 23. The coupling between transmission line section 22 and waveguide 23 may be capacitive and is effected in conventional manner by permitting the internal conductor 22*a* of line section 22 to extend approximately halfway into waveguide 23 in a direction normal to the larger cross-sectional dimension of the guide, as illustrated. At its other end, the waveguide section is provided with a Y-junction 24 which feeds separate waveguide sections 25 and 27 having cross-sectional dimensions which are preferably almost equal to those of section 23. One of these sections 25 is terminated in an antenna or other useful load 26, while the other section 27 is terminated in a dummy load 28.

Coupled to waveguide section 23, at a point interjacent its juncture with transmission line section 22 and its termination in Y-junction 24, is an auxiliary cavity resonator 29, tunable by means of tuning screw 29*a*. The degree of coupling is determined by the width of an iris opening 30 in the lower wall of waveguide section 23, as revealed at the cut-away portion of the waveguide in the figure. In the embodiment illustrated, the coupling is magnetic by reason of the arrangement of the resonator with reference to the waveguide so that the magnetic lines of force in both resonator and waveguide, in the vicinity of the iris, are essentially parallel ($TE_{1,0}$ mode of propagation in the waveguide). However it is to be understood that similar results would be obtained using capacitive coupling. The length of that portion of waveguide section 23, between its coupling to resonator 29 and its juncture with transmission line section 22, is adjustable by means of a "line-stretcher" 35. This is formed conventionally by providing elongated slits 35*a* in opposite walls of the waveguide to permit small variations in the spacing of the other opposing walls of the guide to be effected by turning screw 35*d* in clamp member 35*c*. Similarly, that portion of waveguide 23 between the coupling to resonator 29 and its termination in Y-junction 24, is adjustable in length by means of a similar "line-stretcher" 36. Immediately adjacent the Y-junction there is also provided a tuning screw 41 for the purpose of modifying the voltage standing wave ratio in the waveguide section. These two last-named adjustments make it possible to vary the effective impedance level presented to the heterodyne modulator by its load, and thereby to select the optimum value for effective locking, as more fully discussed in the aforementioned Bradley application.

Waveguide sections 25 and 27 are provided, respectively, with branch portions 37 and 38, which are separately variable in effective length through the agencies of slidable pistons 39 and 40. Each of these branch sections is preferably displaced electrically, from the effective center of Y-junction 24, an integral number of half wavelengths at the fundamental frequency of magnetron oscillator 21. The effective electrical length of section 37 is adjusted to be an integral number of half wavelengths at the magnetron frequency; while that of section 38 is made substantially equal to an odd number of quarter wavelengths at the same frequency. As a result of these adjustments waveguide sections 25 and 27, and their associated sections 37 and 38, will cooperate with dummy load 28, when the impedanec of the latter is made equal to that of useful load 26, to provide, in effect, a bandpass filter interposed between Y-junction 24 and antenna or useful load 26. The filter thus formed will present a substantially constant input impedance at Y-junction 24 and may be adjusted so as to transmit to the antenna or useful load the fundamental frequency component in the output from magnetron oscillator 21, to which will have been imparted variations substantially corresponding to those of the frequency-modulated I.-F. input signal, as will be explained hereinafter.

Magnetron 21, which may be a conventional C.-W. magnetron operating in the S, X or K band, is driven by a suitable driver tube which, in this instance, is pentode 42. The plate of tube 42 is coupled through condenser 43 to the cathode of the magnetron, and the cathode leads supplying heater power thereto may include resistors 48 and 49 respectively, whose functions will be discussed hereinafter, and the elements of a bifilar winding 44 which is adapted to resonate with the circuit capacitance to present a suitable input impedance to the signal supplied to the cathode of the magnetron to drive it. Also, there may be included a resistor 45, connected between the magnetron cathode and ground, which cooperates with the inherent capacitance of the cathode to provide the necessary bandwidth in the coupling circuit between the driver tube 42 and magnetron 21.

The driving signal, which may be a frequency-modulated intermediate frequency carrier, derived from the output of an intermediate frequency amplifier (not shown), is supplied through coupling condenser 47 to the control grid of pentode 42. From theoretical considerations it might be thought that most efficient operation of the magnetron would be obtained if the magnitude of the driving signal were adjusted so as to produce Class C operation of the magnetron (i. e. so that oscillations build up in the magnetron during only a relatively small portion of each I.-F. cycle). Actually this may not be the case because of the relatively large amount of power which is normally required to drive the magnetron Class C. Accordingly, for the achievement of optimum over-all efficiency, it may be preferable to adjust the magnitude of the I.-F. input signal applied to the control grid of tube 42 so as to cause less violent modulation of the magnetron (i. e. so that the magnetron oscillates during a relatively large portion of each I.-F. cycle).

The frequency-modulated input signal applied to drive the magnetron will cause oscillations to build up in the magnetron intermittently at a rate which varies in accordance with the frequency-modulation of the driving signal. As a result of this mode of operation, there will exist, in the magnetron output cavity, signal frequency components corresponding to the normal frequency of oscillation of the magnetron, as well as sideband modulation components corresponding to the sums and differences of the normal frequency of oscillation of the magnetron and integral multiples of the mean or carrier frequency of the frequency-modulated driving signal. As already mentioned heretofore, the normal tendency will be for the fundamental or carrier frequency (corresponding to the natural frequency of oscillation of the magnetron) to remain substantially constant, while the frequency of the sideband components vary in accordance with the frequency-modulation of the driving signal. However, in the arrangement illustrated, owing to the presence of auxiliary cavity resonator 29 coupled to the magnetron output cavity through the agency of waveguide 23 and transmission line section 22 and tuned to the mean frequency of one of the sideband components, a substantial force will be exerted tending to overcome the variation in frequency of that particular sideband component and tending at the same time to produce similar variations in the frequency of the fundamental or carrier component of the magnetron output. It has been determined that such locking of a sideband component will take place where the effective electrical length of the coupling circuits between the output cavity of magnetron 21 and cavity 29, comprising transmission line section 22 and the left-hand portion of waveguide section 23, is equal to an integral number of half wavelengths. Actually it appears that this is not a critical requirement and that this length may be varied considerably without adversely affecting the ability of cavity resonator 29 to lock the selected sideband component in the output from magnetron 21.

As hereinbefore mentioned, the over-all efficiency of a modulating system of the sort just described will be directly dependent upon the relative magnitudes of the carrier component and of the various sideband components in the output from the heterodyne modulated oscillator, the efficiency increasing with an increase in the ratio between the amount of power in the carrier component and the amount of power in the several sideband components, including the one which is locked. The magnitude of this ratio is controllable through appropriate adjustment in the parameters of the system and in the characteristics of the signals supplied to it. More specifically it will increase with increases in the ratio between the mean frequency of the modulated carrier wave input signal to the oscillator and the bandwidth of the oscillator tank circuit, taking into consideration the load imposed upon it by the other components of the system. Thus it would appear that subject to practical limitations, the efficiency of the system could be increased to any desired value simply by increasing the mean frequency of the modulated carrier wave input signal or by decreasing the bandwidth of the oscillator tank circuit. However, as further mentioned in the earlier portion of this specification, when the magnitude of the sideband component which is to be locked becomes too small in relation to the magnitude of the carrier component, it may be impossible to effect complete locking of the sideband component, and hence the frequency deviation of the modulated output signal may be substantially less than that of the modulated input signal. To overcome this difficulty, while at the same time securing high overall efficiency of the system, means are provided in accordance with the present invention for controlling the modulated oscillator in such manner as to maintain the frequency deviation of the modulated output signal more nearly the same as that of the modulated input signal. Such means are also illustrated in the figure.

To this end a portion of the modulated carrier wave output signal from the heterodyne modulated oscillator is derived from the waveguide section 25 by means of a section of transmission line 50 appropriately coupled to waveguide section 25, for example at a point intermediate the junction of the branch portion 37 with section 25 and the junction of section 25 with the antenna or useful load 26. Such coupling may be effected in the usual manner through a coupling loop (not shown) extending into waveguide section 25 at the termination of transmission line 50. The fraction of energy thus derived is supplied through transmission line 50 to a conventional mixer or frequency converter 51. The latter is supplied with a local oscillator signal from a suitable source 51*a* having a frequency such as to effect conversion, in mixer 51, of the signal supplied thereto through transmission line 50 to an intermediate frequency corresponding to that of the modulated carrier wave signals supplied to the input of the heterodyne modulated oscillator via the grid of tube 42. These intermediate frequency signals are supplied, preferably through a conventional I.-F. amplifier 52, to a conventional frequency discriminator circuit 53. The latter functions in the usual manner to develop a video signal which, at any instant of time, possesses a magnitude which is indicative of the frequency deviation of the signal supplied to it through I.-F. amplifier 52, and which is therefore indicative of the frequency deviation of the modulated carrier wave signal present in waveguide section 25, which comprises the useful output from the frequency-modulated oscillator. This video output from discriminator 53 is supplied to one of the inputs of a comparator circuit 54.

A portion of the modulated input signal supplied to the grid of tube 42, in the input of the heterodyne modulated oscillator, is also supplied through a conventional I.-F. amplifier 55 to a second conventional frequency discriminator 56. The latter functions similarly to discriminator 53, but in this instance to produce a video signal whose magnitude at any moment is indicative of the deviation in frequency of the I.-F. input signal to the heterodyne modulated oscillator. This video signal is supplied to the other input terminal of comparator 54.

As illustrated, the comparator 54 may comprise a pair of pentode vacuum tubes 60 and 61 having a common plate load of impedance 62 across which is developed a signal proportional to the sum of the input signals to the tubes respectively. I.-F. amplifier 55 and discriminator 56 may be constructed to cause the output of discriminator 56, applied to the grid of tube 60, to be of a predetermined polarity for a particular polarity of deviation of the I.-F. input signal supplied to the input of I.-F. amplifier 55. Similarly I.-F. amplifier 52 and discriminator 53 may be constructed so that the output from discriminator 53, supplied to the control grid of tube 61, will be of the polarity opposite to that of the output from discriminator 56 for a deviation of the same polarity in the modulated output from the heterodyne modulated oscillator. Under these circumstances the signal developed across resistor 62 will be indicative of the difference in the momentary frequency deviation between the modulated input signal to the heterodyne modulated oscillator and the modulated output signal therefrom. This signal is supplied through connection 57 to the control grid of a pentode tube 58. The latter has its plate connected by means of connection 59 to the cathode of magnetron 21 of the heterodyne modulator oscillator, and has its cathode connected to a suitable source of negative potential B. It operates to develop, across resistors 48 and 49 in the cathode leads of the magnetron, a potential which is proportional to the output from the comparator 54. This potential, which varies with time depending upon the difference in deviation between the output of the heterodyne modulated oscillator and the input thereto, is operative to vary the frequency of the magnetron in a manner to compensate for the difference in deviation.

It will be apparent that when the frequency deviation of the output signal from the heterodyne modulated oscillator is equal to that of the input modulated signal, the inputs to comparator 54 from discriminators 53 and 56, respectively, should be equal in magnitude in order that no control may be exerted upon the magnetron 21 tending to vary its frequency. This condition may be obtained by appropriate adjustment of the gain in I.-F. amplifiers 52 and 55, respectively. Moreover it will be noted that the changes in the outputs of discriminators 53 and 56, for given changes in the deviations of the frequency modulated inputs thereto, should be of proper magnitude and in the appropriate sense so that the resultant output from comparator 54, when applied to the grid of control tube 58, will effect an appropriate change in the cathode voltage of magnetron 21 to produce the necessary alteration in its frequency to compensate as nearly as possible for the difference in deviation between the output and input signals.

In this connection it is first to be noted that the sense in which the normal frequency of oscillation of magnetron 21 should be varied, in order to compensate for a particular instantaneous difference in deviation between the output and input signals, will depend upon whether the instantaneous frequency of the output signal is above or below its mean frequency. If the deviation of the modulated output signal is less than that of the modulated input signal, then the magnetron frequency should be increased whenever the instantaneous frequency of the output signal is above its mean frequency, and should be decreased whenever the instantaneous frequency of the output signal is below its mean value. Further it is to be noted that, depending upon the region in which the magnetron is operated, its frequency may be caused either to increase or to decrease when its cathode voltage is rendered more negative. This will be apparent, for example, from a consideration of the average characteristics of a type 2J32 magnetron as illustrated in Fig. 15, on pages 5–24 of "Principles of Radar" by members of the staff of the Radar School of the Massachusetts Institute of Technology, Mc- Graw-Hill Book Co., Inc., New York, 1946. Accordingly, if the magnetron is operated in a region such that its frequency increases when its cathode voltage is made more negative, then, when the deviation of the modulated output signal is less than that of the modulated input signal, the cathode of the magnetron should be driven more negative when the instantaneous frequency of the output signal is above its mean frequency than when it is below its mean frequency. As will be readily apparent to those skilled in the art, this condition may be achieved by appropriate design of the I.-F. amplifier circuits 52 and 55 and of the discriminators 53 and 56 so that the control signal applied to the grid of tube 58 will vary in the proper sense and magnitude to effect the required variations in the cathode potential of magnetron 21.

It is further to be noted that, for optimum operation of the system according to the invention, the time delays introduced in I.-F. amplifiers 52 and 55 and discriminators 53 and 56, as well as in mixer 51 and comparator 54, should be held to a minimum in order that compensation may be effected substantially instantaneously for a particular difference in the deviations of the input signal to and the output signal from the heterodyne modulated oscillator, and so that there will be no substantial tendency for the correction corresponding to a given discrepancy to be applied at some later time and thereby introduce a correction which bears no direct relation to the discrepancy existing at that later time. Finally it is to be noted that, in general, the gain around the loop comprising mixer 51, I.-F. amplifier 52, discriminator 53, comparator 54, control tube 58 and the associated circuits of the heterodyne modulated oscillator should be less than unity at frequencies comparable to the reciprocal of the time delay around said loop. This condition should be satisfied in order to obviate any tendency for oscillation in the circuit comprising this loop.

Thus it will be seen that the invention provides novel means for improving the operation of heterodyne modulated oscillators, particularly of the sort disclosed in the aforementioned copending Bradley application, and for greatly enhancing their efficiency without adversely affecting their other inherent advantages. While the invention has been described with specific reference to a single embodiment, it will be apparent that it is in no way limited to this embodiment, but is subject to modifications and alterations such as will suggest themselves to those skilled in the art in view of the foregoing specification.

I claim:

1. In a modulating system, a source of a signal of controllable frequency, a source of a second signal of modulated frequency, said second signal having a predetermined frequency deviation, means for mixing said first and second signals to yield a third signal comprising a plurality of frequency components, at least one of which tends to be frequency-modulated in some degree in substantial accordance with the frequency-modulation of said second signal, means for substantially reducing the tendency of said one component to be frequency-modulated, whereby there are imparted to another of said components frequency variations according in some degree to the modulation of said second signal and of reduced frequency deviation, means responsive to the difference in frequency deviation between said other component and said second signal for controlling the frequency of the signal from said first named source, whereby the frequency deviation of said other component is made to approach more closely the frequency deviation of said second signal, and means for deriving an output signal which varies in frequency in accordance with the frequency variations of said other component.

2. In a modulating system, an oscillator of controllable frequency, means responsive to a signal of modulated frequency for modulating said oscillator in a manner to cause it to generate a plurality of signal frequency components, at least one of which tends to be frequency modulated in some degree in substantial accordance with the modulation of said signal, means for substantially reducing the tendency of said one component to be frequency modulated, whereby there are imparted to another of said components frequency variations according in some degree to the modulation of said one component and whose frequency deviation tends to differ from that of said signal, means responsive to said difference in frequency deviation for controlling the frequency of said oscillator in a manner to reduce said difference, and means for deriving an output signal which varies in frequency in accordance with the frequency variations of said other component.

3. In a heterodyne frequency-modulation system, an oscillator responsive to a frequency-modulated carrier wave signal of predetermined carrier frequency for producing a similarly modulated carrier wave signal of different carrier frequency whose frequency deviation tends to differ from the frequency deviation of said first-named modulated signal, a discriminator responsive to said first-named signal for producing an output which varies according to the frequency deviation of said first-named signal, a second discriminator responsive to said last-named signal for producing an output which varies according to the frequency deviation of said last-named signal, means for comparing the outputs of said two discriminators and for producing a control signal which is a function of the difference between said outputs, and means for applying said control signal to said oscillator to control a characteristic of said oscillator in a manner to reduce the difference in frequency deviation between said first-named and said last-named modulated signals.

4. A heterodyne frequency-modulation system, according to claim 3, including a frequency converter for supplying said last-named modulated signal to said second discriminator, said converter being adapted to convert said last-named modulated signal to a modulated signal whose carrier frequency is substantially the same as the carrier frequency of said first-named modulated signal.

5. In a heterodyne frequency-modulation system, an oscillator responsive to an input frequency-modulated carrier wave signal of predetermined carrier frequency for producing a similarly modulated output carrier wave signal of different carrier frequency, whose frequency deviation tends to differ from the frequency deviation of said first-named modulated signal, means responsive to said input and output modulated signals for developing a control signal which varies as a function of the difference in frequency deviation between said input and output modulated signals, and means for utilizing said control signal to control a characteristic of said oscillator in a manner to reduce said difference in frequency deviation.

6. In a heterodyne frequency-modulation system, an oscillator responsive to an input frequency-modulated carrier wave signal of predetermined carrier frequency for producing a similarly modulated output carrier wave signal of difference carrier frequency, whose frequency deviation tends to differ from the frequency deviation of said first-named modulated signal, means responsive to said input and output modulated signals for developing a control signal which varies as a function of the difference in frequency deviation between said input and out modulated signals, and means for utilizing said control signal to control the frequency of said oscillator in a manner to reduce said difference in frequency deviation.

7. In a heterodyne frequency-modulation system, an oscillator responsive to an input frequency-modulated carrier wave signal of predetermined carrier frequency for producing a similarly modulated output carrier wave signal of different carrier frequency, whose frequency deviation tends to differ from the frequency deviation of said input modulated signal, means for developing a signal indicative of the frequency deviation of said input modulated signal, means for developing a second signal indicative of the frequency deviation of said output modulated signal, means responsive to said two last-named signals for developing a control signal which varies as a function of the difference in frequency deviation between said input and output modulated signals, and means for utilizing said control signal to control a characteristic of said oscillator in a manner to reduce said difference in frequency deviation.

STEPHEN W. MOULTON.

REFERENCES CITED

The following references are of record in the file of this patent:

UNITED STATES PATENTS

| Number | Name | Date |
|---|---|---|
| 2,296,962 | Tunick | Sept. 29, 1942 |
| 2,347,459 | Goetter | Apr. 25, 1944 |
| 2,501,368 | White | Mar. 21, 1950 |